ns patent office
3,282,719
Patented Nov. 1, 1966

3,282,719
PELLETIZED CARBON BLACK
Andries Voet, Borger, Tex., assignor to J. M. Huber Corporation, Locust, N.J., a corporation of New Jersey
No Drawing. Filed Sept. 3, 1963, Ser. No. 306,324
10 Claims. (Cl. 106—307)

The present invention relates to a pelletized carbon black.

This application is a continuation-in-part of my co-pending United States application Serial No. 261,492 filed February 27, 1963, now abandoned.

Carbon black conventionally produced from decomposition of hydrocarbons has a density of only about 3 pounds per cubic foot. Such carbon black is readily dispersed in elastomers but cannot be efficiently shipped. The points of manufacture of carbon black are usually far removed geographically from the point of its incorporation into elastomers to form reinforced products, and the required transportation of the carbon black forms an important part of its cost. A densified, pelletized form of carbon black is used exclusively commercially in the reinforcement of elastomers, not only because of its lower transportation cost but particularly because it can be handled by automatic transport systems. Nonpelletized, so called fluffy, carbon black must be packed in bags and requires manual handling, vastly increasing its cost over pelletized blacks. The nonpelletized, or fluffy, carbon black cannot be used in rubber processing plants in a practical manner since it has a tendency to dust in such a way as to fill the plant with carbon black particles, creating extremely difficult problems in housekeeping and working conditions.

While modern rubber processing plants obviously could not possibly economically consider the manual handling of bagged fluffy blacks, yet the fluffy blacks have superior reinforcing qualities to those of conventionally pelletized blacks. These differences are not solely due to that which would result from differences in dispersibility. For instance, by micronizing conventionally pelletized carbon black in a hammer mill, a very finely divided powder is formed which does not seem to differ in appearance from the fluffy carbon black. In addition, it disperses very readily in an elastomer. Yet this micronized, pelletized carbon black has definitely inferior reinforcing qualities when related to the fluffy carbon black and is even inferior to conventionally pelletized black. This is demonstrated in a reinforced rubber compound prepared in a formulation of 100 parts of SBR 1500, 50 parts of HAF black, 4 parts of an aromatic processing oil, 5 parts of zinc oxide, 1.0 part of stearic acid, 1.0 part of Santocure, and 1.8 parts of sulfur. The results have been indicated in the following table. The blacks used were "Aromex" HAF furnace blacks (manufactured by the J. M. Huber Corporation according to U.S. Patent No. 2,625,466) in different forms as indicated in the table.

and remilled black is inferior to even the pelletized material.

The loss in reinforcing characteristics upon pelletization of a black is believed to be caused by the fact that in the process of densification chemical bonds are created between carbon black particles by means of a free-radical mechanism, as explained in Industrial and Engineering Chemistry, Product Research and Development, vol. 1, September 1962, on pages 195–199. The more chemically inert, pelletized blacks do not create strongly reinforcing bonds to the degree of the chemically more reactive, unpelletized blacks.

The primary object of the present invention is to produce carbon black pellets which readily disperse in elastomers to form a reinforced elastomer.

Another object of the invention is to provide substantially dust-free carbon black pellets having enough strength to permit efficient and convenient handling and transporting in automatic systems.

A further object of the invention is to provide carbon black pellets in which the carbon black particles are reactive and have strong reinforcing properties superior to conventionally pelletized black.

A still further object of the invention is to form a composition of matter comprising carbon black in pellet form having an agent incorporated therein which permits easy dispersion of the carbon black into elastomers.

Still another object of the invention is to incorporate simultaneously carbon black and an agent which not only permits easy dispersion of the black, but, in addition, functions as a plasticizer for the polymer.

Other objects and advantages will become apparent in the following specification.

My invention is practiced generally by thoroughly mixing a fluffy carbon black with a small quantity of an oleaginous liquid compatible with an elastomer and thereafter pelletizing the mixture in a dry pelletizing process. The invention may also be practiced by adding an oleaginous liquid in an emulsified form to a water-wetted paste of the fluffy carbon black and then pelletizing the mixture in a wet pelletizing process. Another general method by which the invention may be practiced is to form a water-wetted paste of the carbon black and to add thereto a water-soluble derivative of the oleaginous material which will revert back to the original material when treated by a simple process such as heating. This last general method is followed by wet pelletization and both wet pelletizing processes are followed by drying at elevated temperatures in a conventional manner.

The following theory is offered to assist one to understand the invention and appears to be in accord with observed facts, but it should be understood that I am not limited to this theory. In the prior art processes of pelletization of carbon black, strong chemical bonds between kinetic particle units are formed by means of a free-

TABLE I

| Form of Black | Modulus,[1] p.s.i. | | Tensile,[1] p.s.i. | Percent Abrasion | Shore Hardness [1] | Extrusion Swell, percent |
|---|---|---|---|---|---|---|
| | 300% | 400% | | | | |
| Fluffy | 2,470 | 3,540 | 3,740 | 100 | 65 | 124 |
| Conventionally Pelletized | 2,090 | 3,030 | 3,760 | 89 | 64 | 132 |
| Conventionally Pelletized and Remilled | 2,000 | 2,930 | 3,720 | 86 | 64 | 132 |

[1] 60-minute cure.

It is obvious from Table I that the fluffy black has by far the better reinforcing properties and that the pelletized radical mechanism, as substantiated by physical measurements such as electron spin resonance as well as by direct chemical determination of free radicals, which all indicate a marked decrease of free radical concentration upon pelletization of the fluffy black. In the process of producing the pellets of my invention, these kinetic particle units are coated with an oleaginous material, and this coating was indirectly observed by electron micrography in which the effects of oily films around the small particle clusters acting as kinetic units are clearly visible. In view of steric considerations, direct chemical bonding between the kinetic units is prevented by the films since the strongly adsorbed films of oleaginous materials prevent close approach of the particles to one another. However, the character of the film promotes pelletization by physical interaction uniting physically bound particle clusters into pellets.

Oleaginous materials, as used in the specification and and claims, refer to homogeneous low-volatile organophilic organic substances or compositions, liquid or gaseous at the temperature of application, characterized by their ability to form closely adhering films which envelop the kinetic particle units of the unpelletized carbon black and function as pellets binding material which are completely compatible with and soluble in the elastomer matrix in which the carbon black pellets are to be dispersed.

When the oleaginous material serving as a binder for the pellets is compatible with and soluble in the elastomer, dissolution of the binder occurs under conditions of intimate contact such as occurred during elastomer processing. Upon dissolution of the binder, the pellets disintegrate and the carbon black particles released from the disintegrated pellets disperse rapidly and completely in the elastomer matrix. Since carbon black is generally hydrophobic and oleophilic, the oleaginous materials of the invention are readily adsorbed and spread out over the carbon black particles to form the desired oleaginous film. It can thus be seen that the first requirement for the oleaginous material is its organophilic property. Its compatibility with elastomers is equally important, in view of the pellet disintegration by dissolution of the oleaginous materials in the elastomer. For example, the aliphatic mineral oils are organophilic but they are not generally compatible with elastomers and cannot therefore be used in this invention. Special hydrocarbon oils with a pronounced cycloparaffinic character and particularly those selected fractions of hydrocarbon oils with marked aromatic character are compatible with most elastomers and are suitable oleaginous materials of this invention.

The term "compatibility," as used herein, should be understood to be referring to the ability of forming homogeneous mixtures between the oleaginous material and the elastomers. When the pellets binders are not completely compatible with the elastomer, incomplete dispersions of the binder are formed in the elastomer upon intricate mixing. Such behavior not only may cause incomplete removal of the pellet binder from the pelletized carbon black but may also have deleterious effects on the elastomeric compound. For instance, some of the darkly colored asphaltic types of pellet binders are not truly homogeneous substances but are dispersions which do not dissolve completely in the elastomer but form a dispersion therein. The dispersed state of asphaltic materials used as pellet binders is the cause of strong, highly undesirable staining qualities of the products in which the pellets are used, due to migration of dispersed particles in the polymer. Even nonstaining dispersed materials may have a tendency to migrate, in view of instability. It is therefore essential for the oleaginous materials of this invention to be soluble in and fully compatible with the polymers.

The oleaginous materials of my invention essentially must be of a low volatility in order to prevent a premature removal of the materials from the pellets by evaporation during storage. Materials boiling at temperatures above 175° C. have the desired low volatility required in my invention. In the case of mixtures of materials with a boiling range, the major portion thereof must boil above 175° C. in order that the material have the low volatility required by the invention. Low volatility is equally important where oleaginous materials function as plasticizers in the polymers.

The carbon blacks which are used in practicing the invention incorporate the entire group of carbon blacks which find utility in rubber reinforcement. Channel blacks as well as rubber reinforcing furnace blacks are suitable for practicing the invention, although it should be understood that all types of finely divided carbon or carbonaceous materials which are capable of being formed into pellets in a pelletizing process may be used in the practice of the invention.

Oleaginous materials which are particularly useful in the practice of the invention are the rubber processing oils obtained by solvent extraction from petroleum hydrocarbons. These processing oils are completely compatible with the elastomers due to their substantial content of cycloparaffinic or aromatic compounds, including mixed condensed ring systems. Many thermoplastic resins such as rosin, rosin derivatives, phenolic resins, terpene resins, coumarone-indene resins, thermoplastic urea-formaldehyde and melamine resins, lower molecular polystyrenes, and the like, are excellent oleaginous materials when applied at temperatures slightly above their melting points. These thermoplastic resins may be also used in solution in other oleaginous materials or in a volatile solvent. When used in a volatile solvent, the solvent, which evaporates after application, merely functions as a carrier for the oleaginous material.

Other suitable oleaginous materials are the fatty acids such as oleic acid, lauric acid, stearic acid, and the like. Mixtures of oleaginous materials may also be quite advantageously used. The incorporation temperature maintained during the addition of the oleaginous material to the carbon black during pelletizing is always above the melting point of the material or the mitxure of materials used.

In some instances, temperatures sufficient to vaporize the oleaginous materials are used, whereby the particles of carbon black are coated with the oleaginous material by adsorption and condensation from the vapor phase.

Generally, an application of from 1 to 15 percent by weight of the oleaginous material may be required for the pellets for obtaining satisfactory dispersing qualities in the elastomer. The smaller quantities of this range are advantageously used for coarse carbon blacks with low surface areas, which may be as low as 10 m.$^2$ per gram, while generally the larger quantities are useful for the very fine carbon blacks with high surface areas in the 150 m.$^2$ per gram range.

While the chief function of the oleaginous material is to serve as a binder in the pellets, important additional functions may be served as a plasticizer or extender of the polymer. Conventionally, processing oil when used as an extender of the polymer, is added to the polymer in the mechanical mixing equipment in the liquid form and the oil is slowly taken up. If the addition is too rapid, the batch may break up in smaller chunks of polymer, which escape the masticating action of mixing equipment by rotating individually, lubricated by the excess of oil. Such a condition is highly undesirable and difficult to overcome, leading to losses in time and materials.

If the oleaginous material is incorporated into the carbon black pellets of this invention, incorporation in the polymer occurs without any difficulty at the normal rate of carbon black addition. The quantity of oil which carbon black can take up without forming a plastic mass is determined by its oil absorption. In the oil absorption test oil is gradually added to a given weight of carbon black, which is carefully worked with a spatula on a smooth solid surface, such as, for instance, a glass plate.

The oil absorption point is reached when the oil containing carbon black crumbs can be rolled together and adhere to form a smooth, plastic ball. Before this point is reached, the crumbs still appear to be dry, nonadhering oil-carbon black compositions.

Obviously, an adhering plastic composition of carbon black and oleaginous material cannot be handled in shipment and transportation in plants and the quantity of oil corresponding to an oil adsorption is definitely past the upper limit of usefulness of the pellets of this invention.

Oil absorptions vary for different blacks. The oil adsorption of coarse carbon blacks, such as medium thermal blacks, is about 30 grams of oil per 100 grams of black, while for high structure ISAF blacks values as high as 200 grams of oil per 100 grams of black are found. The quantity varies only slightly with the type of oil used. The very polar linseed oil absorption values for carbon blacks are only a few percent higher than the oil absorption values of the entirely nonpolar mineral oil. The values of other oleaginous materials generally fall between these extremes. Thus, the conventional, or linseed oil absorption values suffice for an approximate indication of the quantity of oleaginous material which a given carbon black can take up just to be converted to a plastic mass by shear or pressure. Experimentally, it was found that quantities of oleaginous materials up to about 90% of the oil absorption values can be incorporated into a carbon black without danger of the resulting pellets becoming adhering plastic masses upon being subjected to shear or pressure. Consequently, the pellets of this invention may contain quantities of oleaginous materials from 1% to about 90% of the oil absorption value to be useful as the carbon black pellet of this invention.

The following specific examples disclose methods by which my invention may be practiced and should not be considered restrictive in scope.

*Example 1*

50 parts by weight of a fluffy, oil furnace carbon black of the type normally used to produce "Aromex" HAF pellets (manufactured by J. M. Huber Corporation by the process of U.S. Patent No. 2,625,466 and having an apparent density of 3 pounds per cubic foot, an approximate average particle diameter of 28 millimicrons and a surface area of about 79 square meters per gram) was heated to about 160° C. in a conventional pin mixer in which the beater ran at 50 r.p.m. To the agitated carbon black was slowly added 4 parts by weight of an aromatic rubber compounding oil containing 68.6% aromatics (produced by Shell Oil Company and known as Shell Dutrex 726). The oil was preheated to 160° C. and was added to the carbon black as a finely divided spray over a period of about 10 minutes. A homogeneous incorporation of the oil in the black was achieved and the mixture was then passed through a conventional screen mill, such as a micropulverizer, to complete the process of homogenation. The homogenized mixture was then pelletized in a conventional dry pelletizer with the resulting pellets having a pour density of 21 pounds per cubic foot. The finished pellets were then dispersed in an elastomer forming a superior dispersion.

The pellets of Example 1 and conventionally pelletized HAF black were each compounded in a rubber recipe as indicated below (Control A). Also included are tests in which 4 parts of processing oil were added to conventionally pelletized black first (Control B).

| Rubber Ingredients | Control A | Control B | Example 1 |
|---|---|---|---|
| SBR 1500 | 100.0 | 100.0 | 100 |
| Black of Control B |  | 54 |  |
| Black of Example 1 |  |  | 54.0 |
| Conventional Pellets | 50.0 |  |  |
| Aromatic Processing Oil | 4.0 |  |  |
| Zinc Oxide | 5.0 | 5.0 | 5.0 |
| Stearic Acid | 1.0 | 1.0 | 1.0 |
| Santocure | 1.0 | 1.0 | 1.0 |

The results of conventional tests on these rubber compounds are reported in Table II below.

TABLE II

| Form of Black | Modulus,[1] p.s.i. | | Tensile,[1] p.s.i. | Percent[2] Abrasion | Shore Hardness[1] | Extrusion Swell, Percent |
|---|---|---|---|---|---|---|
|  | 300% | 400% |  |  |  |  |
| Control A | 2,090 | 3,030 | 3,760 | 89 | 64 | 132 |
| Control B | 2,070 | 3,040 | 3,780 | 90 | 64 | 130 |
| Example 1 | 2,390 | 3,400 | 3,750 | 97 | 65 | 126 |

[1] 60-minute cure.
[2] Fluffy black from Table I is 100%.

The above results indicate superior reinforcing qualities when the pellets of Example 1 are compared with conventional pellets with the properties approaching closely those of fluffy black. It is equally clear that mixing of already formed pellets with processing oil has no effect whatsoever on the properties of the vulcanizate (Control B).

Thus, the oleaginous material does not satisfy the objects of this invention if it is merely an additive to an already formed pellet but it satisfies the object of this invention only when it acts as a pellet binding material.

*Example 2*

Example 1 was repeated substituting Sundex 85, a highly aromatic compounding oil produced by Sun Oil Company, for the Shell Dutrex 726. The reinforcing results obtained in a rubber vulcanizate are nearly identical to those obtained with Shell Dutrex 726 and are superior to those of conventional pellets.

*Example 3*

100 parts by weight of the fluffy furnace carbon black described in Example 1 was combined with 100 parts by weight of water followed by 2 minutes agitation in a pin mixer. An emulsion was prepared consisting of Shell Dutrex 726 in water as follows: To 100 parts by weight of the Dutrex 726 oil was added 2 parts by weight of "Duomeen" T monooleate (monooleate of the diamino propyl derivative of tallow fatty acids, manufactured by Armour & Company). The mixture was heated at 60° C. and slowly added to 400 parts by weight of vigorously agitated water heated at 60° C., whereupon a rather stable emulsion was formed.

40 parts by weight of the above emulsion was added to the water-wetted black and agitation was continued for an additional 5 minutes. The resulting pellets were dried at 165° C. and had an apparent density of 22 pounds per cubic foot. The properties of the pellets as a reinforcing pigment in a vulcanizate were practically identical to the properties of the pellets of Example 1 and superior to those of conventional pelletized black.

Example 4

Example 3 was repeated substituting Sundex 85 described in Example 2 for the Shell Dutrex 726. The results obtained in a rubber vulcanizate are nearly identical to those obtained when using Shell Dutrex 726 and are superior to those with conventional pellets.

Example 5

50 parts by weight of a fluffy furnace carbon black of the type normally used to produce a pelletized black known as "Aromex-" ISAF (produced by the J. M. Huber Corporation and having an apparent density of 3.5 pounds per cubic foot, an approximate average particle diameter of 23 millimicrons and a surface area of about 115 square meters per gram) was heated while being stirred to about 160° C. in a conventional pin mixer. To the agitated carbon black was slowly added 6 parts by weight of a solution preheated to 160° C. of FF wood rosin in Circosol NS containing 33.3% rosin. Circosol NS is a naphthenic rubber compounding oil produced by Sun Oil Company. The solution was slowly added to the agitated black by spraying so that a homogeneous incorporation was achieved. The mixture of carbon black and solution was then passed through a micropulverizer, following which it was pelletized in conventional dry pelletizing equipment. The resulting pellets have a pour density of 20 pounds per cubic foot and are easily dispersed in elastomers forming a superior dispersion.

The pellets of Example 5 and conventionally pelleted ISAF black were compounded in the rubber recipe as shown below.

| Rubber Ingredients | Control Pellets | Fluffy ISAF Black | Example 5 |
|---|---|---|---|
| SBR 1500 | 100 | 100 | 100 |
| Pellets of Example 5 | | | 56 |
| Fluffy ISAF Black | | 50 | |
| Conventional ISAF Pellets | 50 | | |
| Circosol NS | 4 | 4 | |
| FF Wood Rosin | 2 | 2 | |
| Zinc Oxide | 5 | 5 | 5 |
| Stearic Acid | 1.5 | 1.5 | 1.5 |
| Santocure | 1 | 1 | 1 |
| Sulfur | 1.8 | 1.8 | 1.8 |

The above compounds were tested conventionally and the results are shown in Table III below.

TABLE III

| Form of Black | Modulus,[1] p.s.i. 300% | Modulus,[1] p.s.i. 400% | Tensile,[1] p.s.i. | Percent Abrasion | Shore Hardness[1] | Extrusion Swell, Percent |
|---|---|---|---|---|---|---|
| Control Pellets | 2,280 | 3,360 | 4,110 | 91 | 66 | 129 |
| Fluffy ISAF | 2,690 | 3,800 | 4,140 | 100 | 67 | 120 |
| Example 5 | 2,420 | 3,540 | 4,120 | 96 | 66 | 123 |

[1] 60-minute cure.

Example 6

100 parts by weight of a fluffy channel carbon black (produced by J. M. Huber Corporation and normally used to produce pelletized "Wyex" EPC black, having an average diameter of about 29 millimicrons and a surface area of 115 square meters per gram) was heated to 150° C. in a conventional pin mixer. To the agitated black was added 3 parts by weight of stearic acid heated to 150° C. and added as a finely divided spray. The black was thereafter passed through a micropulverizer and was then pelletized in a conventional dry pelletizer. The resulting pellets had a pour density of 23 pounds per cubic foot. Tested in a conventional rubber recipe, it was found that the pellets of this example dispersed extremely easily and exhibited superior reinforcing properties when compared with the properties of conventionally pelletized "Wyex" EPC black.

Example 7

100 parts by weight of a fluffy furnace carbon black (manufactured by J. M. Huber Corporation and normally pelletized to produce "Arovel" FEF black, of an average particle diameter of 42 millimicrons and a surface area of 48 square meters per gram) was mixed with 100 parts by weight of water followed by 2 minutes mixing in a pin mixer. A solution was prepared of 3.5 parts by weight of the ammonium salt of lauric acid in 35 parts by weight of water by neutralization of the corresponding quantities of lauric acid with ammonia in an aqueous medium. The solution was added to the water-wetted black. Agitation was continued for an additional 5 minutes. The resulting pellets were dried at 170° C. and had an apparent pour density of 21 pounds per cubic foot. The properties of the black as a fast extruding black in a vulcanizate are superior to those of conventional "Arovel" FEF pellets and approach those of fluffy black of the same character.

Example 8

Example 1 was repeated, but instead of the conventional HAF a high structure ISAF was used. To 65 parts of the high structure ISAF a quantity of 35 parts of the processing oil were added. The pellets formed had a density of 20.5 pounds per cubic foot.

The finished pellets were then dispersed in an elastomer, forming a superior dispersion.

The pellets of Example 8 and the conventionally pelletized high structure HAF black were each compounded in a synthetic rubber recipe as indicated below. Control C is a recipe in which the conventional black and the processing oils were added separately, while in Control D 35 parts of the processing oil were added to 65 parts of the conventionally pelletized black under agitation.

| Rubber Ingredients | Control C | Control D | Example 8 |
|---|---|---|---|
| Polybutadiene | 50.00 | 50.00 | 50.00 |
| SBR | 50.00 | 50.00 | 50.00 |
| Naphthenic Polymer Extension Oil | 18.75 | 18.75 | 18.75 |
| High Structure ISAF | 75.00 | | |
| Black of Control D | | 115.00 | |
| Black of Example 8 | | | 115.00 |
| Zinc Oxide | 3.00 | 3.00 | 3.00 |
| Stearic Acid | 3.00 | 3.00 | 3.00 |
| Flexamine G [1] | 2.00 | 2.00 | 2.00 |
| Paraffin Wax | 3.00 | 3.00 | 3.00 |
| Naphthenic Processing Oil | 40.00 | | |
| MBTS [2] | 0.70 | 0.70 | 0.70 |
| Diphenyl guanidine | 0.55 | 0.55 | 0.55 |
| Sulfur | 1.50 | 1.50 | 1.50 |

[1] Flexamine G is a mixture of arylamines.
[2] MBTS is benzothiazyl disulfide.

The results of conventional tests on these rubber compounds are reported in Table IV below:

TABLE IV

| Form of Black | Modulus,[1] p.s.i. | | Tensile, p.s.i. | Abrasion,[2] Percent | Shore Hardness[1] | Extrusion Swell, Percent |
|---|---|---|---|---|---|---|
| | 300% | 400% | | | | |
| Control C | 810 | 1,180 | 1,660 | 100 | 57 | 54 |
| Control D | 800 | 1,150 | 1,680 | 102 | 57 | 54 |
| Example 8 | 890 | 1,320 | 1,670 | 120 | 57 | 52 |

[1] 60-minute cure, 300° F.
[2] Control C set at 100%.

The above results indicate superior reinforcing qualities when the pellets of Example 8 are compared with conventional pellets. Moreover, the incorporation rate into the polymer would be more rapid in the case of Example 8, in the absence of processing oils.

*Example 9*

Example 1 was repeated but instead of the conventional HAF a high structure HAF was used and to 78 parts of black 22 parts of an aromatic processing oil were added. The pellets had a density of 20.8 pounds per cubic foot.

The finished pellets were then dispersed in an elastomer forming a superior dispersion.

The pellets of Example 9 and a conventionally pelletized high structure HAF black were each compounded in a natural rubber recipe as indicated below and compared with a Control E in which the conventional pellets and oil were added separately, as well as Control F, in which 22 parts of the aromatic processing oil were added slowly, under agitation, to the conventionally pelletized black, the oil-black mixture being used in the Control B test.

| Rubber Ingredients | Control E | Control F | Example 9 |
|---|---|---|---|
| Smoked Sheet | 100.0 | 100.0 | 100.0 |
| HAF-HS | 50 | | |
| Black of Control F | | 64.0 | |
| Black of Example 9 | | | 64.0 |
| Aromatic Processing Oil | 14.0 | | |
| Zinc Oxide | 3.0 | 3.0 | 3.0 |
| Stearic Acid | 3.0 | 3.0 | 3.0 |
| Agerite Resin D [1] | 1.5 | 1.5 | 1.5 |
| Santoflex D [2] | 1.0 | 1.0 | 1.0 |
| Vultrol [3] | 0.5 | 0.5 | 0.5 |
| Santocure [4] | 0.5 | 0.5 | 0.5 |
| Sulfur | 2.5 | 2.5 | 2.5 |

[1] Polymerized Trimethyldihydroquinoline.
[2] 6 dodecyl 1-2 dihydro 2.2.4 trimethyl quinoline.
[3] N-nitrosodiphenylamine.
[4] N-cyclohexyl 2 benzothiazolsulfenylamide.

The results of conventional tests on these rubber compounds are reported in Table V below.

TABLE V

| Form of Black | Modulus,[1] p.s.i. | | Tensile, p.s.i. | Abrasion,[2] Percent | Shore Hardness[1] | Extrusion Swell, Percent |
|---|---|---|---|---|---|---|
| | 300% | 400% | | | | |
| Control E | 1,460 | 2,160 | 3,600 | 100 | 71 | 123 |
| Control F | 1,450 | 2,120 | 3,560 | 99 | 71 | 124 |
| Example 9 | 1,700 | 2,410 | 3,700 | 118 | 71 | 120 |

[1] 75-minutes cure at 280° F.
[2] Control E at 100%.

The superiority of the black of Example 9 is obvious. The incorporation of the black is rapid and there is time saving over control in view of the absence of processing oils.

From the above examples and the foregoing description, it is apparent that by my invention I have produced new and valuable pellets having novel and desirable properties which are capable of producing elastomer vulcanizates having improved reinforcement properties. These pellets at the same time have sufficient strength to permit transportation and handling in the same manner as conventional pellets without any of the limitations of the fluffy blacks in transportation and handling.

Oil absorption values as used herein are derived from a test applied to carbon blacks whereby a black is mixed with linseed oil to form a coherent mass. It is expressed in grams of oil per 100 grams of black. In carrying out the test, generally oil is slowly, dropwise added to the black which is being worked carefully with a spatula. The oil is taken up by the black powder, which remains in a dry, somewhat lumpy condition. At the moment the oil absorption value is reached, however, the entire oil-black mixture rolls into a single ball as it is being worked with a spatula.

Having thus described the preferred embodiments of the invention, it should be understood that other modifications and adaptations may be resorted to without departing from the scope of the appended claims.

I claim:

1. A pelletized carbon black suitable for compounding in elastomers consisting of a fluffy carbon black and a quantity of an oleaginous pellet binding material of from 1.0% to 90% of the oil absorption value of the carbon black, with the individual kinetic particle units of the carbon black separately coated with a film of the oleaginous pellet binding material.

2. A pelletized carbon black as in claim 1 wherein the oleaginous material is an aromatic rubber compounding oil.

3. A pelletized carbon black as in claim 1 wherein the oleaginous material is an aromatic rubber compounding oil obtained by solvent extraction from crude petroleum hydrocarbon fractions.

4. A pelletized carbon black as in claim 1 wherein the oleaginous material is a cycloparaffinic rubber compounding oil obtained by solvent extraction from hydrocarbon fractions.

5. A pelletized carbon black as in claim 1 wherein the oleaginous material is a solution of about 33% FF wood rosin in a cycloparaffinic hydrocarbon rubber compounding oil.

6. A pelletized carbon black as in claim 5 consisting of from about 85 to 99 parts by weight of the fluffy carbon black and from about 1 to 15 parts by weight of oleaginous material.

7. A pelletized carbon black as in claim 1 wherein the oleaginous material is stearic acid.

8. A pelletized carbon black as in claim 7 consisting of from about 85 to 99 parts by weight of the fluffy carbon black and from about 1 to 15 parts by weight of oleaginous material.

9. A pelletized carbon black as in claim 1 wherein the oleaginous material is lauric acid.

10. A pelletized carbon black as in claim 1 consisting of from about 85 to 99 parts by weight of the fluffy carbon black and from about 1 to 15 parts by weight of oleaginous material.

References Cited by the Examiner

UNITED STATES PATENTS

| 2,167,674 | 8/1939 | Offutt | 106—307 |
| 2,635,057 | 4/1953 | Jordan | 106—307 |
| 2,699,381 | 1/1955 | King | 106—307 |
| 2,848,347 | 8/1958 | Rushford | 106—307 |
| 2,891,872 | 6/1959 | Voet | 106—307 |
| 2,960,413 | 11/1960 | Voet | 106—307 |
| 3,011,902 | 12/1961 | Jordan | 106—307 |

HELEN M. McCARTHY, *Acting Primary Examiner.*

TOBIAS E. LEVOW, S. E. MOTT, *Assistant Examiners.*